April 5, 1949.  L. BRAUN  2,466,366

AUTOMOBILE ROOF AND END WALL

Filed July 10, 1946  7 Sheets-Sheet 1

INVENTOR
Ludwig Braun
BY
ATTORNEY

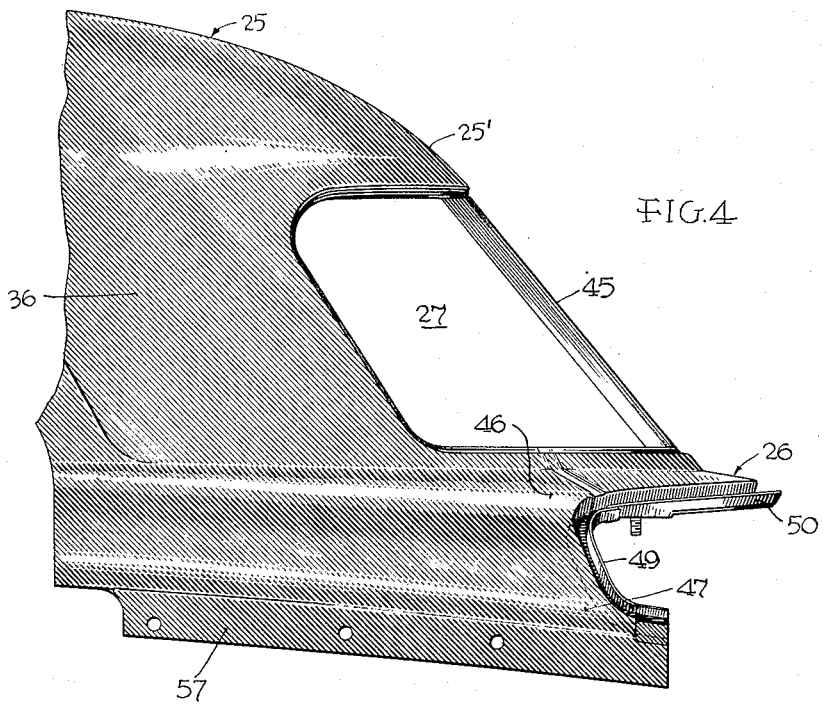
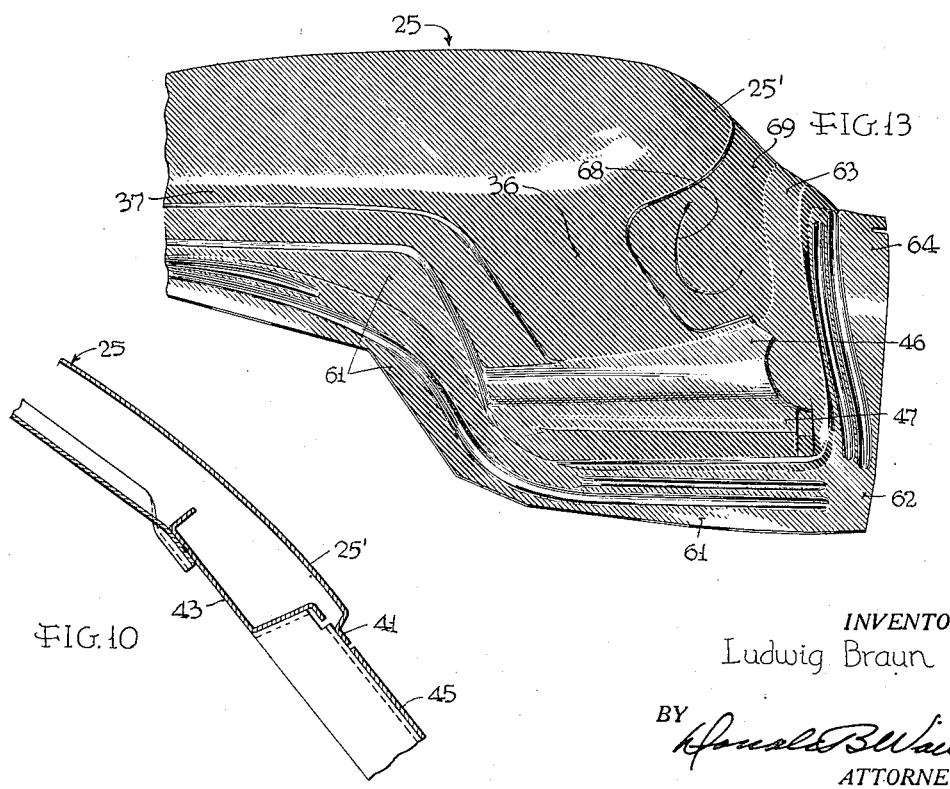

April 5, 1949.  L. BRAUN  2,466,366
AUTOMOBILE ROOF AND END WALL
Filed July 10, 1946  7 Sheets-Sheet 3
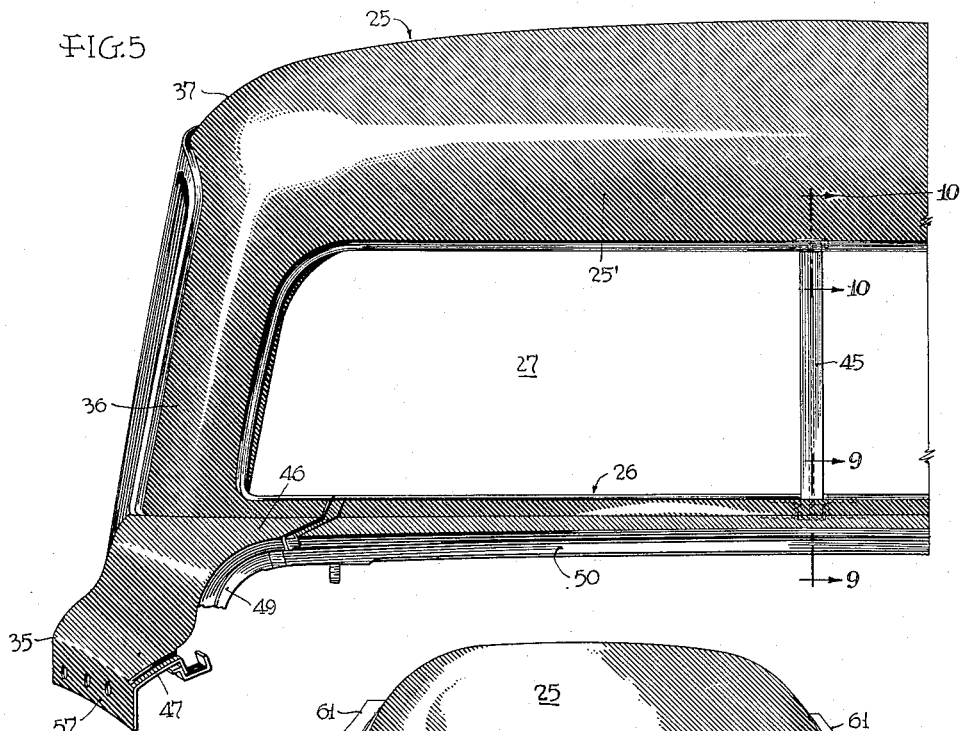
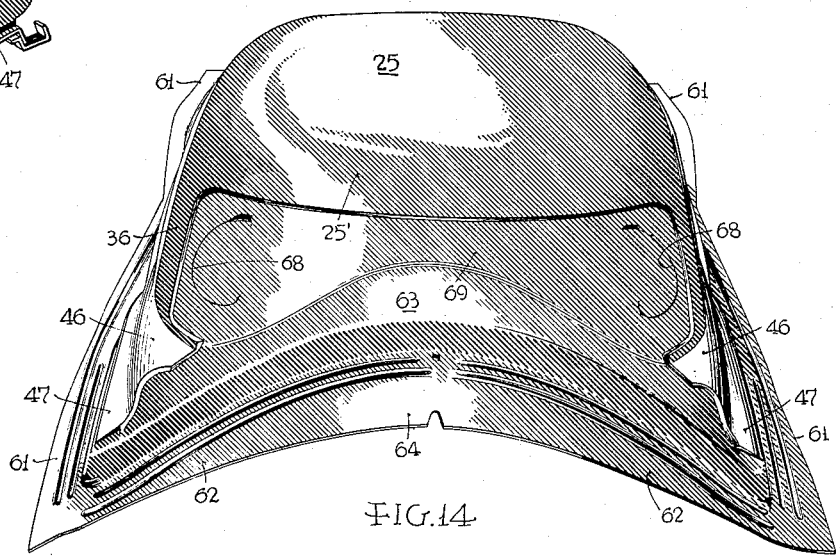
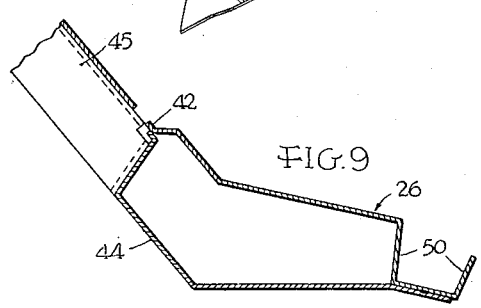
INVENTOR
Ludwig Braun
BY
*Donald B Waite*
ATTORNEY April 5, 1949.  L. BRAUN  2,466,366
AUTOMOBILE ROOF AND END WALL
Filed July 10, 1946   7 Sheets-Sheet 4
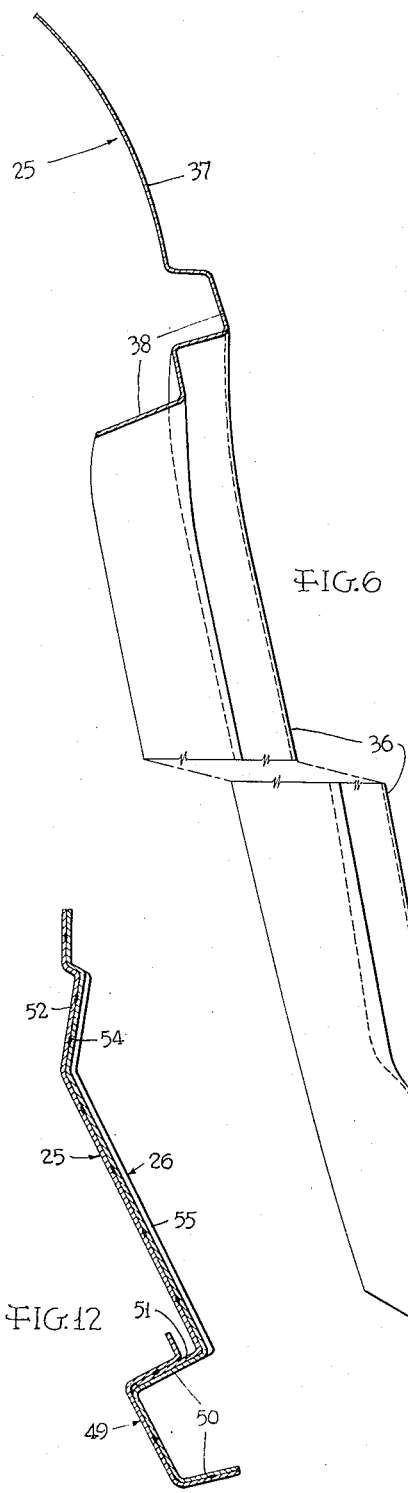
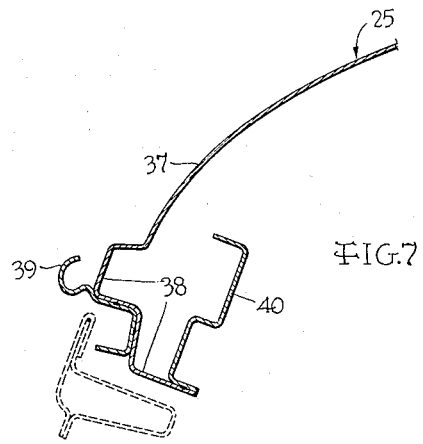
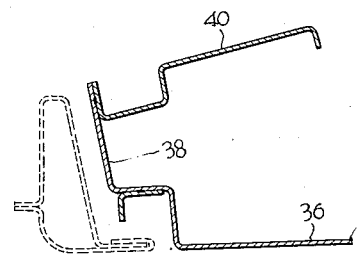
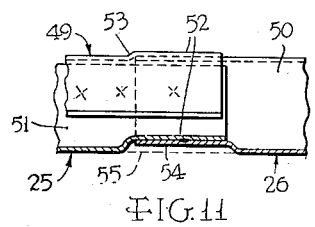
INVENTOR
Ludwig Braun
BY
ATTORNEY

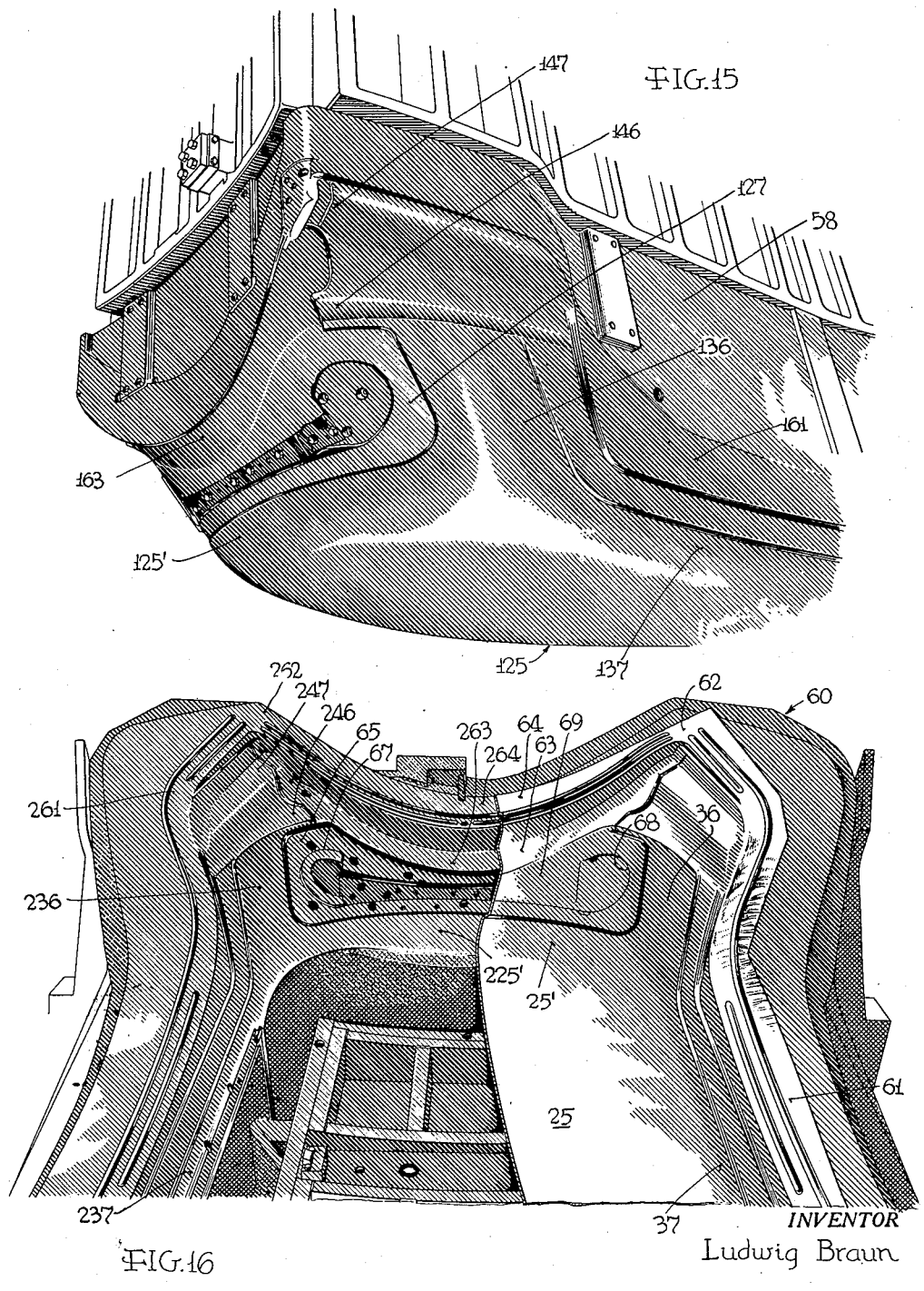

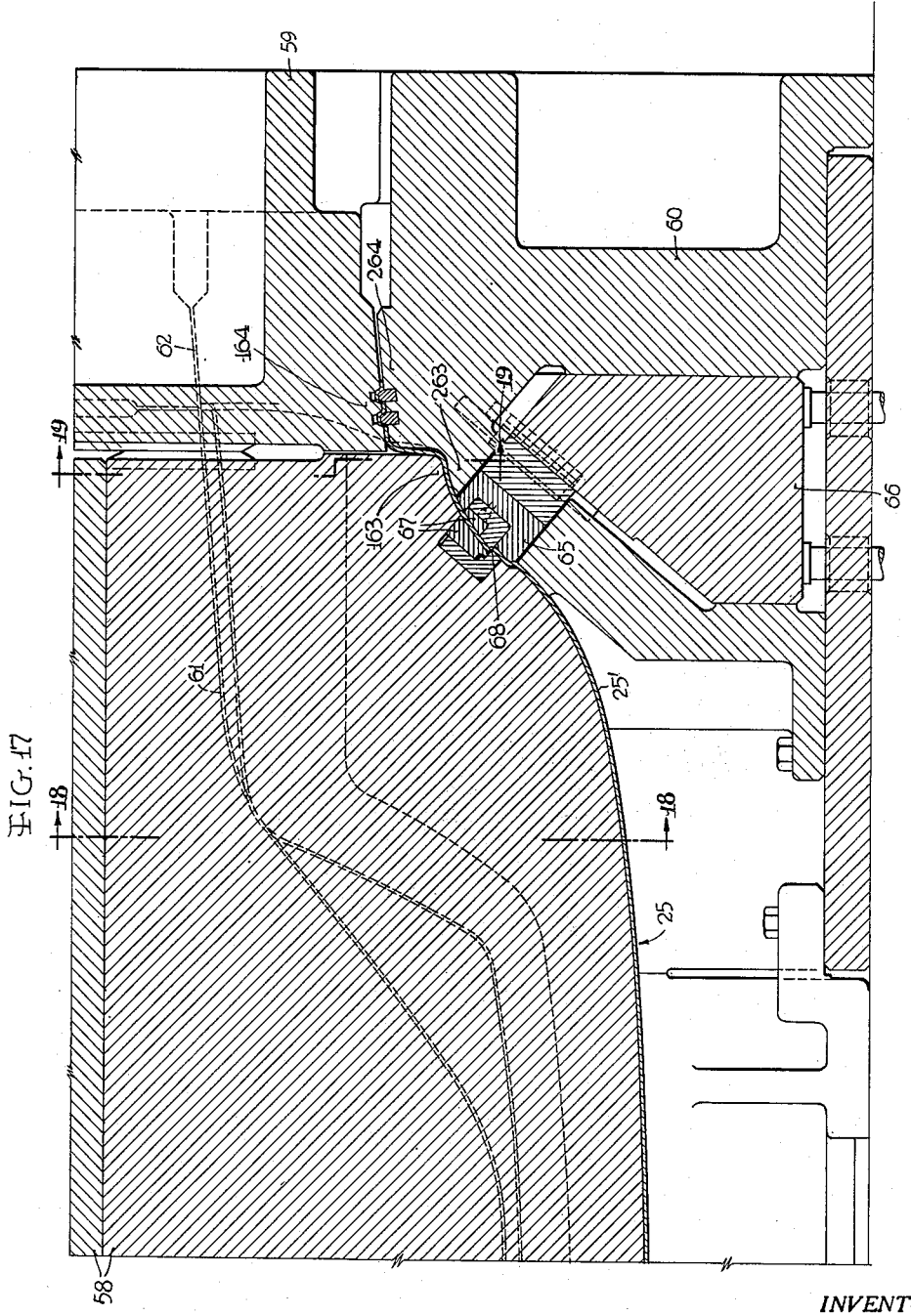

April 5, 1949.　　　　　　　L. BRAUN　　　　　　　2,466,366
　　　　　　　AUTOMOBILE ROOF AND END WALL
Filed July 10, 1946　　　　　　　　　　　　　　　7 Sheets-Sheet 7

INVENTOR
Ludwig Braun
BY
ATTORNEY

Patented Apr. 5, 1949

2,466,366

UNITED STATES PATENT OFFICE 2,466,366

AUTOMOBILE ROOF AND END WALL

Ludwig Braun, Philadelphia, Pa., assignor to The Budd Company, Philadelphia, Pa., a corporation of Pennsylvania Application July 10, 1946, Serial No. 682,512

5 Claims. (Cl. 296—137)

The invention relates to an automobile body and, more particularly, to a roof of the type extending downwardly at one or both ends so as to form respectively parts of the front and/or rear wall and sometimes parts of the side walls.

In the manufacture of automobile bodies to be pressed of sheet metal, the designer has to decide which panel portions to combine into one stamping and where to locate the seams connecting the stampings in the complete body. Often, the decisions reflect mere routine engineering skill based on similar problems and their solutions used for previous designs.

Yet, sometimes an entirely new situation arises requiring unconventional treatment or a new and surprising solution is found for an old situation which had been dealt with previously in a less advantageous way. Such is the case with the present invention.

The invention is concerned with a new combination of body portions into unitary stampings and subassembly units respectively and with the arrangement of the seams connecting the stampings and units. The advantages achieved by the invention are greater ease of manufacturing the unitary roof and end wall stampings of the above-indicated type and considerable reduction of the length of the welding seams connecting such stampings with adjoining stampings, especially of such seams exposed to view and therefore requiring careful finishing operations before the paint is applied.

More specifically, the invention refers to a roof of the indicated type in which the roof is downwardly extended at the rear and adjoined by rear quarter panel portions, that is, side panel portions between the rear side window or door post and the rear view opening. Hitherto it has been common practice to weld such quarter panel sections to the roof so as to constitute therewith one subassembly unit or to form such panel sections as parts of the side wall units to be connected with the roof subassembly in the final assembly operation. Both known procedures entail long welding seams at locations exposed to view and therefore requiring careful finishing.

According to the invention, the rear quarter panel sections are formed as integral one-piece portions of the roof stamping, whereas the transverse member below the rear view opening, or at least a considerable part thereof, is formed as a separate stamping which is connected with the roof stamping in a subassembly operation. With this arrangement and procedure, there are only two short seams between the rear view opening and the trunk lid opening which require welding and careful finishing.

This new design permits using a new form of die for and a new method of making the roof stamping, which method and equipment together with a preliminary form of the stamping constitute the subject matter of the inventor's application "Method of and means for making an automobile roof and stamping for such roof," Serial No. 782,646, filed October 28, 1947 as a division of the present application. However, for the sake of completeness, these features are disclosed also in the present application, and will become apparent as the description proceeds.

The details of the invention as well as the specific problems involved and the advantages achieved are fully disclosed in the attached drawing and the following description of an embodiment;

In the drawing,

Figure 4 is a fragmentary side elevation of the rear part of the roof unit on about the scale of Figure 3;

Figure 5 is a fragmentary end elevation of the left-hand side and part of the right-hand side of the roof unit on about the scale of Figures 3 and 4;

Figures 6, 7 and 8 are fragmentary sections through the side margins of the roof unit taken along the correspondingly numbered lines of but on a larger scale than Figure 1 and viewed in the direction of the arrows on such lines;

Figures 9 and 10 are fragmentary sections through the rear middle portion of the roof, the sections being taken along the correspondingly numbered lines of Figures 2 and 5 and the scale being about the same as that of the preceding Figures 6 to 8;

Figures 11 and 12 are fragmentary sections through the connection between the main roof stamping and the separate stamping below the rear view opening, the sections being taken along the correspondingly numbered lines of Figure 3 and the scale being somewhat larger than the scale of the preceding sectional figures;

Figure 13 is a perspective fragmentary side elevation of the rear portion of the main roof stamping after the first forming operation on a smaller scale than Figure 4;

Figure 14 is a perspective rear elevation of the stamping shown in Figure 13;

Figure 15 is a fragmentary perspective rear and side elevation of the plunger of the first forming die;

Figure 16 is a fragmentary perspective inside view of the rear portion of the lower die number and of a part of a stamping in place in the die;

Figure 18:
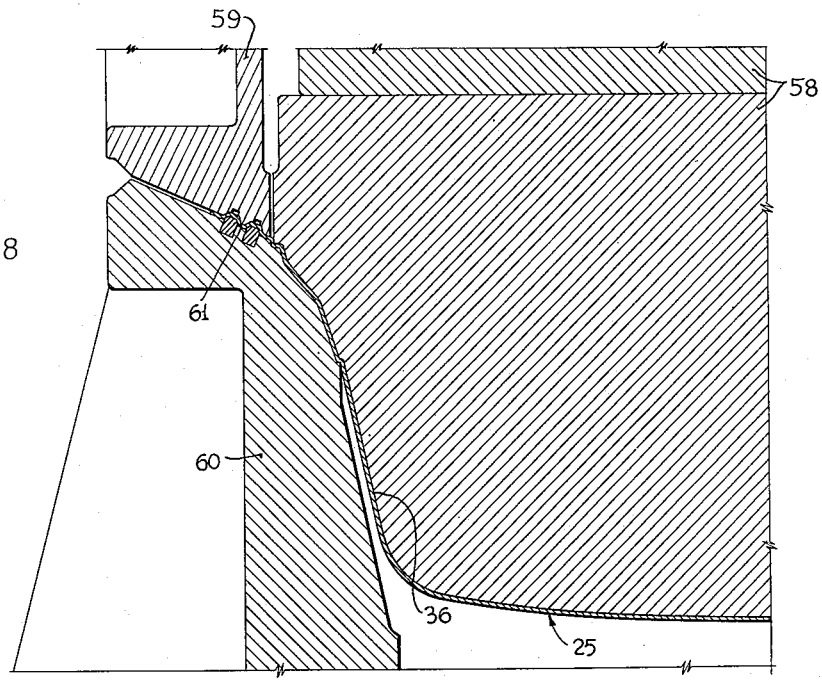
Figure 19:
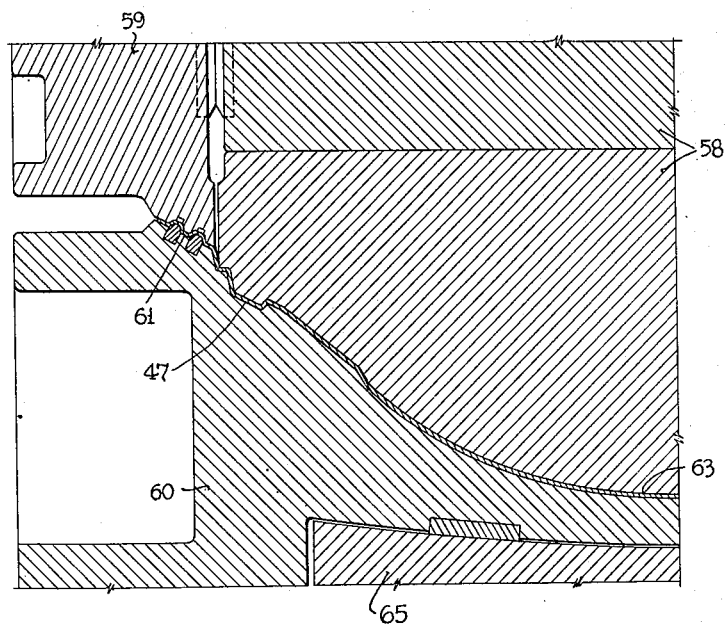

Figure 17 is a fragmentary somewhat diagrammatic section through the die members shown in Figures 15 and 16 and through the upper margin holder with a stamping in place between these members, the section being taken along the longitudinal vertical center plane of the stamping and the die; and Figures 18 and 19 are fragmentary somewhat diagrammatic sections through the lateral side portions of the members shown in Figure 17 and on about the same scale, the sections being taken along transverse vertical planes in the regions indicated by lines 18—18 and 19—19 of Figure 17.

The outer shell of the roof subassembly unit illustrated in Figures 1 to 12 comprises as outstanding elements a large main stamping 25 and a small transverse rail member 26 between the rear view opening 27 and the trunk opening 28, the latter to be closed by the trunk lid 29. The stamping 25 is downwardly curved at the rear so as to form the header 25' of the rear view opening 27.

At the front, as is quite customary, the main stamping 25 may be extended downwardly so as to constitute the windshield header 30, the upper front post covers and windshield side frame members 31, and the lower transverse windshield frame member and cowl top 32. The roof stamping extends from the belt line 33 in the front post region over the openings for the doors 34 and along the upper portion of the rear door opening down to the belt line and preferably slightly therebeyond to line 35 as will be discussed more fully later on.

In the region defined by the rear door opening, the rear view window opening 27 and the lower side margin, the stamping 25 constitutes on each side the rear quarter panel 36.

Along the door openings, the roof stamping 25 is downwardly arched at 37, is beaded and inwardly flanged at 38, and connected to separately made drip channel and inner reinforcing or header members 39 and 40 (Figures 7 and 8). Stamping 25 with its flanges 38 and reinforcements 39, 40 forms the door rails.

Around the rear view opening 27 both stampings 25 and 26 are flanged at 41, 42 and connected with inner reinforcing members 43, 44 and a center mullion 45.

The forward side corners of the trunk opening 28 as well as the lower side corners of the rear view opening 27 are formed by stubs or horns 46, 47 of the main stamping 25. The horns 46 are continued and interconnected by the stamping 26, whereas the horns 47 are continued by lateral stampings 48 indicated in Figure 1. The stampings 25 and 26 are provided along the margin of the trunk opening with a channel section formation 49, 50 for sealing the margins of the trunk lid 29. The channel 49 is formed on each side by a separate member welded to an inturned flange 51 of the stamping 25.

Figure 1:
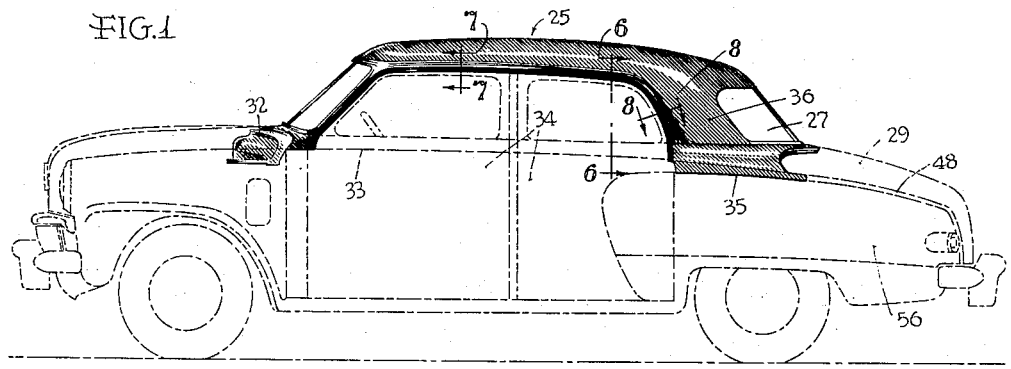
Figure 1 is a diagrammatic side elevation of an automobile showing the roof subassembly unit in heavy lines, whereas the remainder of the body is indicated by mere dot-and-dash lines.
Figure 2:
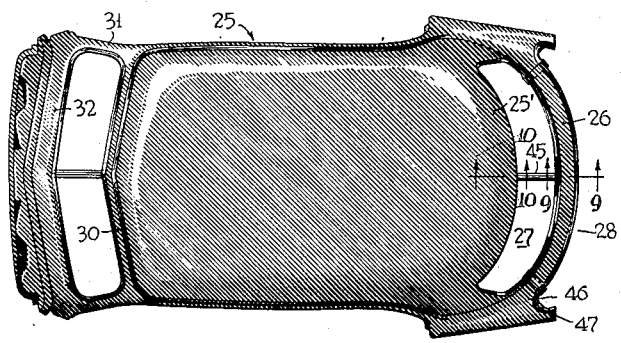
Figure 2 is a plan view of the roof unit alone on a slightly smaller scale than Figure 1.
Figure 3:
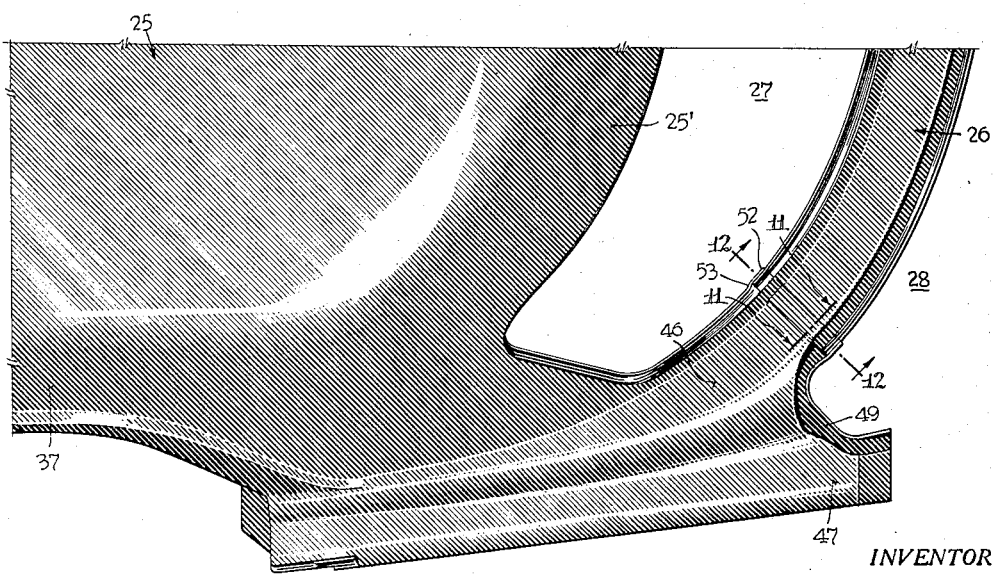
Figure 3 is a fragmentary plan view on a larger scale of the rear left-hand corner of the roof unit shown in Figure 2.

The stamping 25 with member 49 and the stamping 26 overlap each other for a short distance, as clearly indicated in Figures 3, 11 and 12, and the overlapping portions 52 of members 25, 49 are slightly offset at 53 for the reception of the marginal end portion 54 of member 26. Besides, both overlapping portions 52, 54 are inwardly offset between the flanges 41, 42 and the channels 49, 50 so that after the connection of the overlapping portions, such as by spot welding, a shallow channel remains. This channel is filled with solder to the level (indicated by line 55 in Figures 11 and 12) of the adjoining outer surface portions of the members 25, 26, so that after polishing and painting the joints between stampings 25 and 26 are invisible and the roof has the appearance of a single stamping.

As indicated in the introductory paragraphs, the manufacture of the roof unit comprising the members 25, 26 as a single mono-piece stamping would be, at least economically, unfeasible, so that hitherto designs were employed which are different from the design illustrated in the drawing and described so far. The described and illustrated roof unit lends itself to a manufacturing method which is economical and which permits assembly of the component parts with a relatively small amount of labor and of expense for finishing the unit, the latter advantage being largely due to the shortness of the welding seams between the horns 46 of the stamping 25 and the ends of the stamping 26. In previously made roof units of comparable size and shape, the seams to be hidden would extend from a point between the upper rear corner of the rear door opening to the trunk opening, that is, a distance which is many times, frequently about 8 to 10 times, longer than the visible part of the joints between the members 25 and 26 of the construction according to the present invention.

The rear quarter portion 36 of the stamping 25 extends to the top margin of the rear fender 56 and is provided with a connecting flange 57 so that on each side the fender hides from view the connection of the stamping 25 with the adjoining parts of the body side wall. The horns or stubs 47 and the stamping 48 may be connected with each other in a similar manner as described above for the connection between the stubs 46 and the cross member 26. Here again, the visible parts of the seam, extending merely from the trunk lid 29 to the fender 56, are extremely short and, consequently, require but little solder and finishing work.

The main forming die for drawing the large roof stamping 25 comprises a plunger or upper die member 58, an upper margin holder 59, and the combined lower die member and margin holder 60. These three members cover or surround the entire area of a roof stamping 25 though Figures 15 to 19 illustrate only the rear region because the construction of the die in the front region may follow known, well established lines.

The portions of the upper and lower die members 58 and 60 shaped corresponding to the respective parts of the roof stamping 25 are identified by reference characters 100 and 200 numbers higher, respectively. Thus, the portions corresponding to the rear quarter side panel 36 are marked 136 (Figure 15) on the plunger 58 and 236 on the lower die member (Figure 16). This obviates largely the necessity of describing the forming contours of the dies.

During the stamping operation, the margins 61, 62 of the blank are held between the surfaces 161, 162 and 261, 262 of the upper margin holder 59 and the lower die 60 respectively. It will be understood that the lower die 60 is stationary and that the upper margin holder 59 comes down first so as to grip the margins of the blank whereupon the plunger 58 moves down and shapes the sheet while drawing material in from the margins in overcoming the friction exerted on the blank by the margin holders.

A detailed description of the drawing procedure, of the die, and of its mounting in a press (not shown) is deemed unnecessary as these features are well known. The only, yet important, exception is the unconventional formation of the die and the drawing procedure in the rear region of the roof member 25 which will now be described.

In the rear region, the plunger 58 has a high hump 163 extending close to the portion 125' for forming the header of the rear view opening and the upper margin holder 59 has a similar hump 164 while the lower die is recessed at 263, 264 corresponding to the shape of said humps 163, 164.

On account of these humps and recessed portions of the margin holders and die members, which extend in the center close to the main central area of the stamping 25, it is possible to draw the wide and deep rear quarter side portions 36. The provision of these humps and recesses is, on the other hand, admissible only on account of the formation as a separate stamping of the panel 26 between rear view opening 27 and trunk opening 28. The unfinished stamping as shown in Figures 13 and 14 has arched portions 63, 64 corresponding to the humps 163, 164 and recesses 263, 264, and these arched portions 63, 64 must later be removed.

For the formation of the rear view opening 27 as far as it is enclosed by the stamping 25, the lower die 60 is provided with a transversely reciprocable member 65 which is brought into engagement with the blank in a final operation by means of wedge 66 actuated by appropriate means (not shown). This reciprocable member 65, wedge 66 and plunger 58 are provided with cooperating cutting members 67 serving to make cuts 68 (Figures 13 and 14) for relieving the tension in the blank. These cutters are indicated only diagrammatically because they are well known expedients.

It will be understood that the stamping shown in Figures 13 and 14 and partly in Figure 16 as produced by the die illustrated in Figures 15 to 19 is subsequently trimmed so as to remove the marginal portions 61, 62 and the portions 69 covering the rear view opening and, furthermore, that the stamping is subject to additional forming operations for obtaining the undercut flanges 38 and other details of the final shape which are not obtained by the first forming operation. However, it is not necessary to describe the subsequent trimming and forming operations because they may be carried out along lines well established in the art.

Only after the stamping 25 has attained its final shape is it connected with the separately made transverse panel 26 and other supplemental members, such as 39, 40, 43, 44, 49 and the solder is filled in and polished off at the joints between the members 25 and 26, whereupon the roof subassembly unit is ready for assembly with adjoining members of the body.

The invention is not restricted to the illustrated embodiment but may be modified; e. g., it may be adapted to different roof shapes. More particularly, the invention is applicable to roofs which do not extend as far to the front as shown in the embodiment but which may end to the rear of or at the windshield opening. In case of rear quarter side window openings, the rear quarter panels of the roof may extend to the top and rear margins of or may include such openings. The invention may also be applied to the formation at the front of the body for forming the front posts and the windshield frame. Protection is sought broadly for the invention including its modifications and adaptations as expressed by the spirit and the language of the attached claims.

What is claimed is:

1. In a roof and end wall structure for an automobile body, a one-piece stamping extending over the width of the body and constituting at least a large portion of the generally horizontal region of the roof adjoining one end wall of the body, said stamping having on each side a downwardly extending portion constituting on each side a side and corner panel between a side wall opening an an end wall window opening extending down to the belt line region, said downwardly extending portions having formed thereon the corners of a lower end wall opening and being provided each with a stub or horn between the adjacent corners of said window opening and said lower wall opening, and a separately manufactured member secured to and interconnecting said stubs and defining the main portions of the adjacent transverse margins of said window opening and of said lower wall opening, said stamping lending itself to economical manufacture of designs in which the inclusion of the member between the two openings in the stamping would cause undue depth of draw or would require a separate member on each side with a correspondingly greater length of welding seams.

2. One-piece stamping for an automobile body constituting a large portion of the generally horizontal extent of the roof adjoining an end wall and including quarter side panels between body side openings and the side margins of a window opening in said end wall, the lower corner of said extensions adjacent said end wall being provided with a pair of stubs each so as to form the lower corners of the end wall window opening and the adjacent corners of a lower end wall opening, said stubs being adapted for connection respectively to a transverse member between said end wall openings and to panel members along the side margins of said lower end wall opening, such stamping overcoming the difficulties encountered with certain designs in which the inclusion of the member between the two openings in the stamping would cause undue depth of draw or would require a separate member on each side with a correspondingly greater length of welding seams.

3. A sheet metal stamping for automobile bodies, extending over the width of the body and constituting at least a large portion of the generally horizontal region of the roof adjoining end wall, such as the rear wall of the body, said stamping having on each side a downwardly extending portion constituting a quarter side panel between a side opening and an end wall window opening, said downwardly extending portions being provided each with a stub or horn at the lower corner of the window opening, and a connection between said stubs made subsequent to the formation of the stamping so as to form the transverse member along the lower margin of the window opening, this formation of the stamping helps to overcome the difficulties encountered with certain designs in which the depth of draw would be too deep when the transverse member along the lower margin of the window opening is formed as an uninterrupted part of the stamping.

4. Sheet metal stamping for use in automobile bodies having a roof, an end wall provided with a window opening, and side wall portions adjoining roof and end wall, the stamping forming the roof over its entire width adjacent the end wall and having on each side an extension forming the end wall along the lateral margin of said window opening and the adjoining portion of the side wall to the exclusion of at least part of the end wall along the lower margin of said window opening, the excluded part of the end wall to be formed by another separately made sheet metal member which is to be secured to and is to interconnect said extensions of said stamping, this construction permitting economical manufacture of such designs in which the inclusion in the stamping of the end wall portion along the lower margin of the window opening involves undue depth of draw in the end wall region or would require two additional separate members, one on each side of the end wall, as well as longer welding seams for connecting the two members to the stamping.

5. Sheet metal stamping for use in automobile bodies having a roof, an end wall provided with a window opening, and side wall portions adjoining roof and end wall, the stamping forming the roof over its entire width adjacent the end wall and having on each side an extension forming the end wall along the lateral margin of said window opening and the adjoining portion of the side wall to the exclusion of at least part of the end wall along the lower margin of said window opening, the excluded part of the end wall being formed by another separately made sheet metal member which is secured to and interconnects said extensions of said stamping, this construction permitting economical manufacture of such designs in which the inclusion in the stamping of the entire end wall portion along the lower margin of the window opening involves undue depth of draw in the end wall and side wall regions or would require two additional separate members, one on each side, for forming parts of said side wall portions as well as longer welding seams for connecting such members to the stamping.

LUDWIG BRAUN.

REFERENCES CITED

The following references are of record in the file of this patent:

UNITED STATES PATENTS

| Number | Name | Date |
|---|---|---|
| 1,718,217 | Crawford | June 25, 1929 |
| 1,898,883 | Matheson | Feb. 21, 1933 |
| 2,106,677 | Ledwinka | Jan. 25, 1938 |
| 2,116,313 | Lundberg | May 3, 1938 |
| 2,176,738 | Clark | Oct. 17, 1939 |
| 2,209,563 | Deisley | July 30, 1940 |
| 2,256,837 | Trautvetter | Sept. 23, 1941 |

FOREIGN PATENTS

| Number | Country | Date |
|---|---|---|
| 495,512 | Great Britain | Nov. 15, 1938 |